United States Patent
Kondou (10) Patent No.: US 7,604,247 B2
(45) Date of Patent: Oct. 20, 2009

(54) MOUNT STRUCTURE OF VEHICLE BODY VIBRATION DAMPING APPARATUS

(75) Inventor: Katsuhiro Kondou, Shizuoka-ken (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 222 days.

(21) Appl. No.: 11/923,936

(22) Filed: Oct. 25, 2007

(65) Prior Publication Data
US 2008/0100099 A1 May 1, 2008

(30) Foreign Application Priority Data
Oct. 25, 2006 (JP) ............................ 2006-289678

(51) Int. Cl.
 *B62D 25/20* (2006.01)
 *B62D 21/00* (2006.01)
(52) U.S. Cl. .................. 280/124.109; 280/124.108; 280/782; 296/1.03; 296/204
(58) Field of Classification Search .......... 280/124.108, 280/124.109, 124.107, 782, 124.1, 124.101; 180/312; 296/1.03, 204
See application file for complete search history.

(56) References Cited

U.S. PATENT DOCUMENTS

| | | | |
|---|---|---|---|
| 4,279,428 A | * | 7/1981 | Onodera .............. 280/124.108 |
| 4,501,436 A | | 2/1985 | Ishida |
| 4,763,948 A | * | 8/1988 | Harasaki ................ 296/203.02 |
| 5,074,587 A | * | 12/1991 | Schwede et al. ............ 280/781 |
| 5,181,736 A | * | 1/1993 | Kokubun ............. 280/124.109 |
| 6,206,460 B1 | * | 3/2001 | Seeliger et al. ............. 296/204 |
| 6,595,533 B2 | * | 7/2003 | Sawai et al. ........... 280/124.108 |
| 2006/0125225 A1 | * | 6/2006 | Kondou et al. .............. 280/781 |

FOREIGN PATENT DOCUMENTS

| | | |
|---|---|---|
| EP | 1 209 062 A2 | 5/2002 |
| JP | 2002-211437 | 7/2002 |
| WO | WO 2006/090586 A1 | 8/2006 |

OTHER PUBLICATIONS

European Search Report; dated Jan. 30, 2008; 4 pages.

* cited by examiner

*Primary Examiner*—Ruth Ilan
(74) *Attorney, Agent, or Firm*—Knobbe, Martens, Olson & Bear, LLP (57) ABSTRACT

An extended section is provided on a head of a mounting bolt used to mount attached components, such as a front suspension member, a rear suspension member, and a rear stability brace, to a floor panel of a monocoque body. The extended section extends along the axis of the mounting bolt in a direction opposite to a threaded section. A male screw is formed on the extended section. Mount brackets of the vehicle body vibration damping apparatus can be mounted to the male screw.

14 Claims, 6 Drawing Sheets

MOUNT STRUCTURE OF VEHICLE BODY VIBRATION DAMPING APPARATUS

CROSS-REFERENCE TO RELATED APPLICATIONS

This application claims the benefit of Japanese Patent Application No. JP 2006-289678, filed on Oct. 25, 2006, the disclosure of which is incorporated herein by reference in its entirety.

BACKGROUND OF THE INVENTION

1. Field of the Invention

The present invention generally relates to a mount structure of a vehicle body vibration damping apparatus used to mount the vehicle body vibration damping apparatus to a body frame. More particularly, the present invention relates to a mount structure that allows the vibration damping apparatus to be attached using the same structure used to attach other components to the body frame of a vehicle.

2. Description of the Related Art

Conventionally, forces can be transferred to a body frame of a vehicle from a suspension system during operation. With the transfer of the forces, vibrations can be generated in the body frame by momentary compression and expansion in the body frame. Ride comfort is deteriorated by the vibrations. Therefore, it is desirable to reduce or eliminate such vibrations.

A conventional vehicle body vibration damping apparatus that can reduce the generation of vibrations in a body frame is disclosed, for example, in JP-A-2002-211437. The vehicle body vibration damping apparatus disclosed in JP-A-2002-211437 is formed in a shape of a rod in which a damping force generation means is provided in a middle section. The damping force generation means can be a fluid chamber or an elastic member. The vehicle body vibration damping apparatus extends between laterally paired parts on the associated suspension system.

In order to mount the vehicle body vibration damping apparatus to a vehicle body, a mount section provided on both ends of the vehicle body vibration damping apparatus is mounted to the vehicle body by a dedicated mounting bolt directly or via a dedicated mount bracket. The part on the side of a vehicle body in which the vehicle body vibration damping apparatus is mounted includes an upper end of a pair of shock absorbers at the left and right sides of the suspension system, a body frame positioned in the vicinity of the upper end, and so forth.

SUMMARY OF THE INVENTION

According to the mount structure of the vehicle body vibration damping apparatus disclosed in JP-A-2002-211437, it is necessary to provide a specifically-designed mount space for receiving the mount section of the vehicle body vibration damping apparatus in the body frame. On the other hand, a number of parts such as parts for a steering system and parts for the brake system are closely disposed around a suspension system of a vehicle. Because the mount structure of the vehicle body vibration damping apparatus disclosed in JP-A-2002-211437 requires the mounting space described above, it can be difficult to provide adequate space in which the suspension, brake and vibration damping components can be positioned.

In addition, when the vehicle body vibration damping apparatus is mounted to the vehicle body using a dedicated mount bracket, the mount bracket enlarges the occupied space and the manufacturing cost increases because the number of parts necessary increases by including the mount brackets and mounting hardware.

A mounting bolt for the suspension system can be used to secure the suspension system with the vehicle body vibration damping apparatus to the body frame to compactly mount the vehicle body vibration damping apparatus to the vehicle body and to reduce the number of parts. However, the mount structure described above cannot correctly mount the vehicle body vibration damping apparatus to the vehicle body. This is because the mounting bolt for mounting the suspension system to the body frame is tightened to a high tightening torque level so that the suspension system is firmly mounted to the vehicle body.

The torque at a time when the mounting bolt is tightened is transmitted to the mount section of the vehicle body vibration damping apparatus by friction. Accordingly, the force in the direction of rotation around the end through which the mounting bolt penetrates is applied to the vehicle body vibration damping apparatus. As each end of the vehicle body vibration damping apparatus is mounted to the vehicle body by the mounting bolt, the high tightening torque is applied to the each end of the vehicle body vibration damping apparatus.

In other words, as the mounting bolt is tightened with high torque, the force in the direction in which the vehicle body vibration damping apparatus is sheared is applied on the vibration damping apparatus from both ends. Consequently, the vehicle body vibration damping apparatus is mounted to the vehicle body in a state in which the vehicle body vibration damping apparatus is unnecessarily distorted. As a result, the vehicle body vibration damping apparatus cannot be correctly mounted to the vehicle body as described above. Properly mounting the vehicle body vibration damping apparatus is somewhat important because the stroke of the vehicle body vibration damping apparatus is on the order of microns Resolving the distortion can be accomplished by providing a rotation stopper member to the vehicle body. The stopper member can be used to stop rotation of the vehicle body vibration damping apparatus during installation. However, the rotation stopper member must be generally large and sturdy in order to prevent the rotation of the vehicle body vibration damping apparatus in resistance to the high torque applied to the mounting bolt. As a result, contrary to the original intention, the mount structure is enlarged.

Thus, an object of certain features, aspects and advantages of an embodiment of the present invention is to provide a mount structure for mounting the vehicle body vibration damping apparatus to the vehicle body while the structure thereof is compact and has a small number of parts.

BRIEF DESCRIPTION OF THE DRAWINGS

These and other features, aspects and advantages of the present invention will now be described with reference to the drawings of certain preferred embodiments, which embodiments are intended to illustrate and not to limit the present invention.

DETAILED DESCRIPTION OF THE PREFERRED EMBODIMENT

An embodiment of a mount structure of a vehicle body vibration damping apparatus that is arranged and configured in accordance with certain features, aspects and advantage of an embodiment of the present invention will be described in detail hereinafter with reference to FIG. 1 through FIG. 6.

Figure 1:
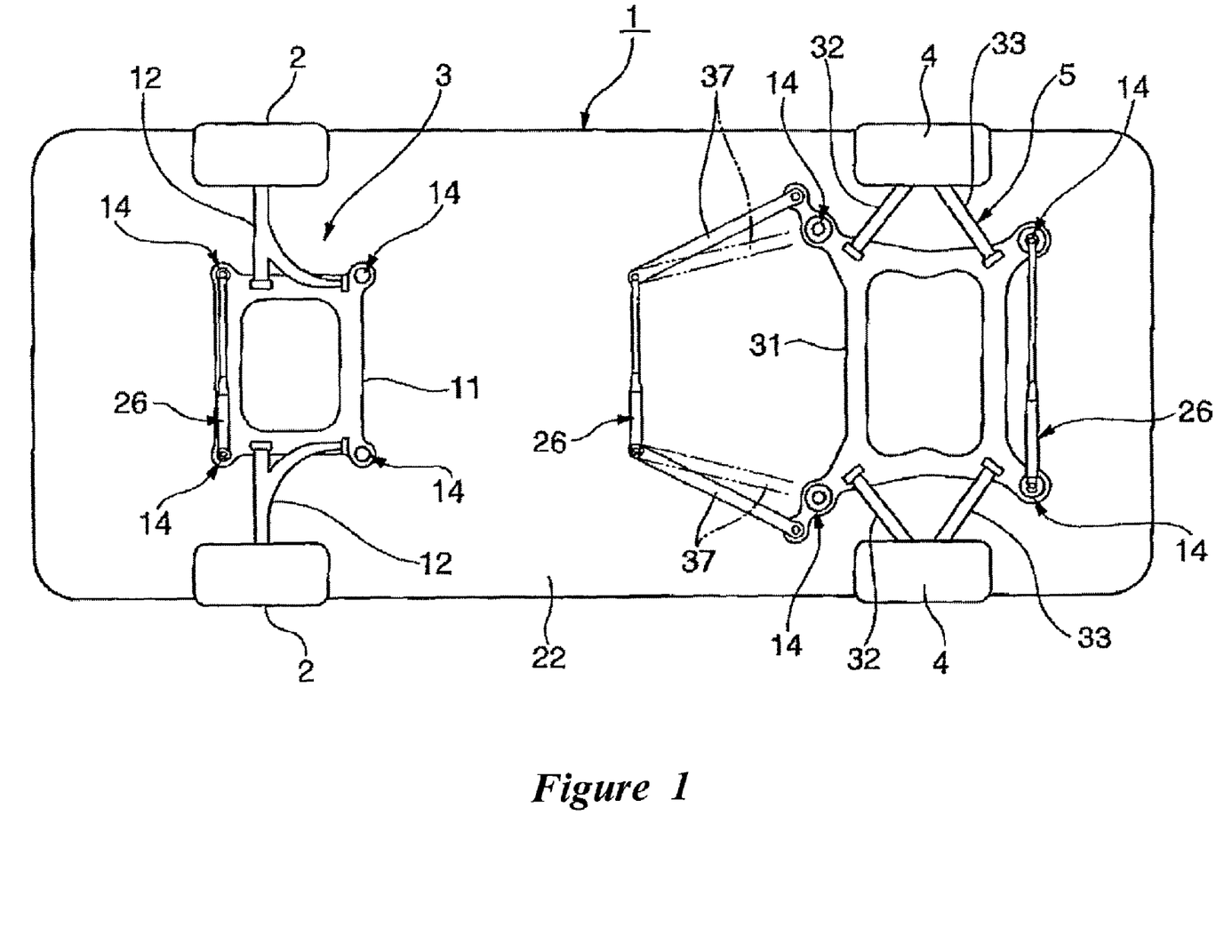
FIG. 1 shows a bottom plan view illustrating a vehicle provided with a vehicle body vibration damping apparatus that is arranged and configured in accordance with certain features, aspects and advantages of an embodiment of the present invention.

A monocoque body 1 can be formed by welding and combining a plurality of board materials and pipes that have been press formed. The monocoque body is but one example of a body frame. Certain features, aspects and advantages of the illustrated vehicle body vibration damping apparatus also can be used with other types of vehicle body frames.

A front wheel suspension 3 can be provided in the front end of the monocoque body 1. Front wheels 2 can be mounted to the front wheel suspension 3. A rear wheel suspension 5 can be provided in the rear end of the monocoque body 1. Rear wheels 4 can be mounted to the rear wheel suspension 5.

Figure 4:
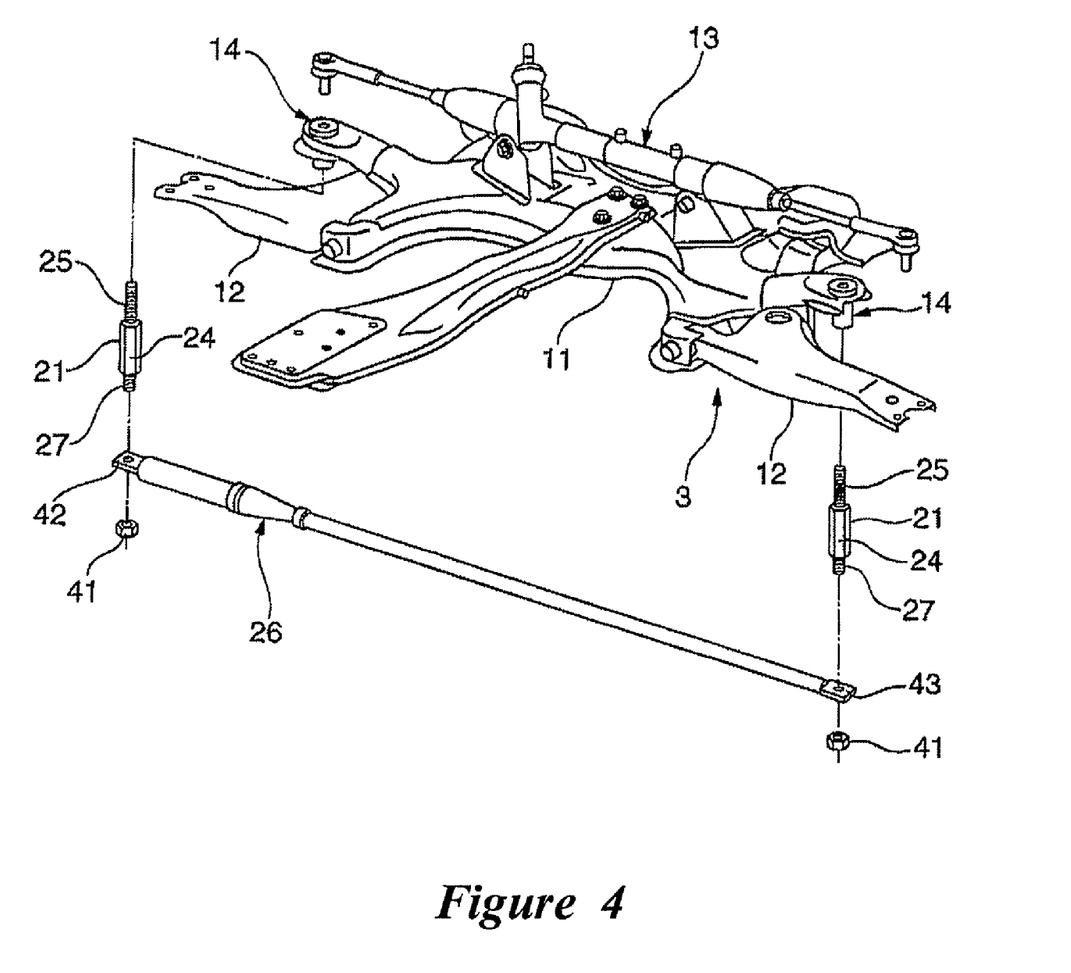
FIG. 4 is a perspective view illustrating an example in which the vehicle body vibration damping apparatus is mounted to mounting bolts also used to mount the suspension.
Figure 5:
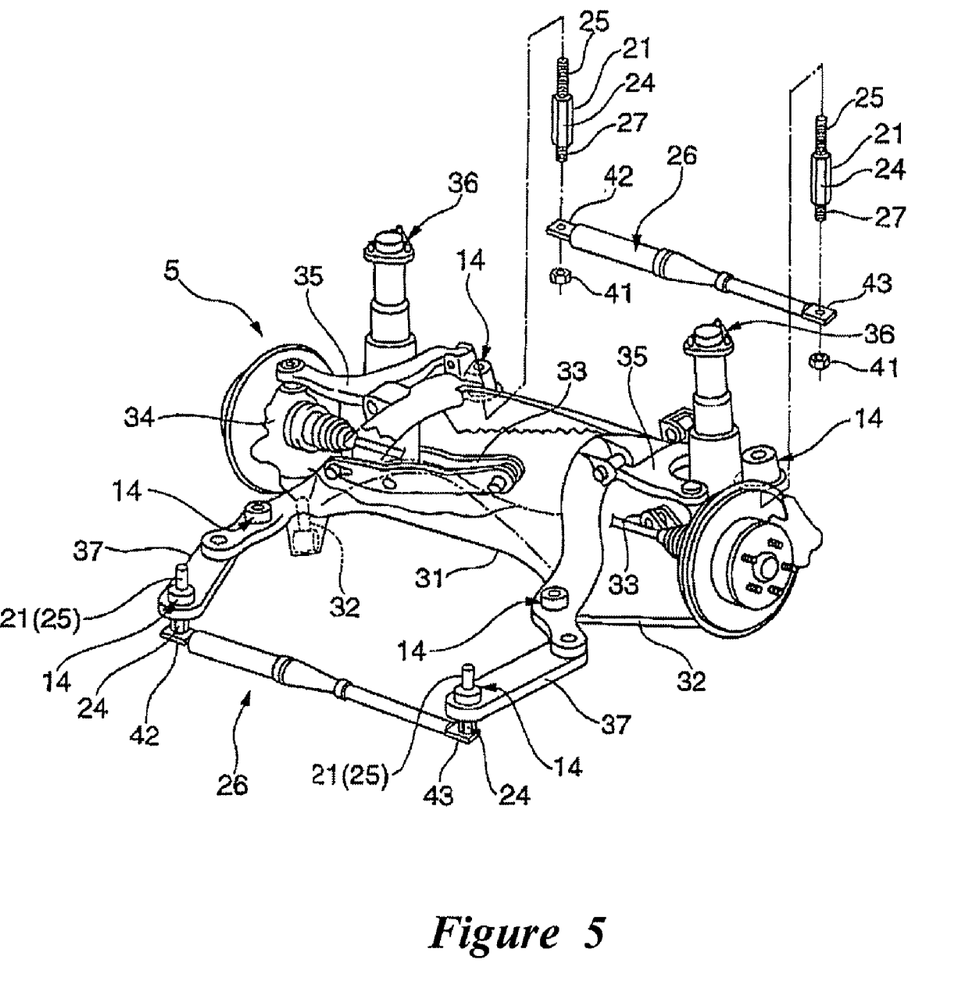
FIG. 5 shows a perspective view illustrating an example in which the vehicle body vibration damping apparatus is mounted to the mounting bolts used to mount the rear wheel suspension and to the mounting bolts used to mount rear stability braces.

In the illustrated configuration, the front wheel suspension 3 is a double wishbone type of suspension. As shown in FIG. 1 and FIG. 4, the front wheel suspension 3 comprises a front suspension member 11 and a pair of lower control arms 12 at the left and the right sides. The control arms 12 are supported for pivoting movement in the vertical direction by the front suspension member 11. The front wheel suspension 3 also comprises, among other components, a pair of knuckles, upper arms, and cushion units at the left and the right sides (not shown).

A power steering system 13 can be mounted above the front suspension member 11, as shown in FIG. 4.

The front suspension member 11 forms a frame that can support parts included in the front wheel suspension 3. Mount members 14 used to mount the front suspension member 11 to the monocoque body 1 can be provided on both ends of the front suspension member 11 in the width direction of the vehicle on the front side of the vehicle body of the front suspension member 11 and on the rear side of the vehicle body respectively.

Figure 2:
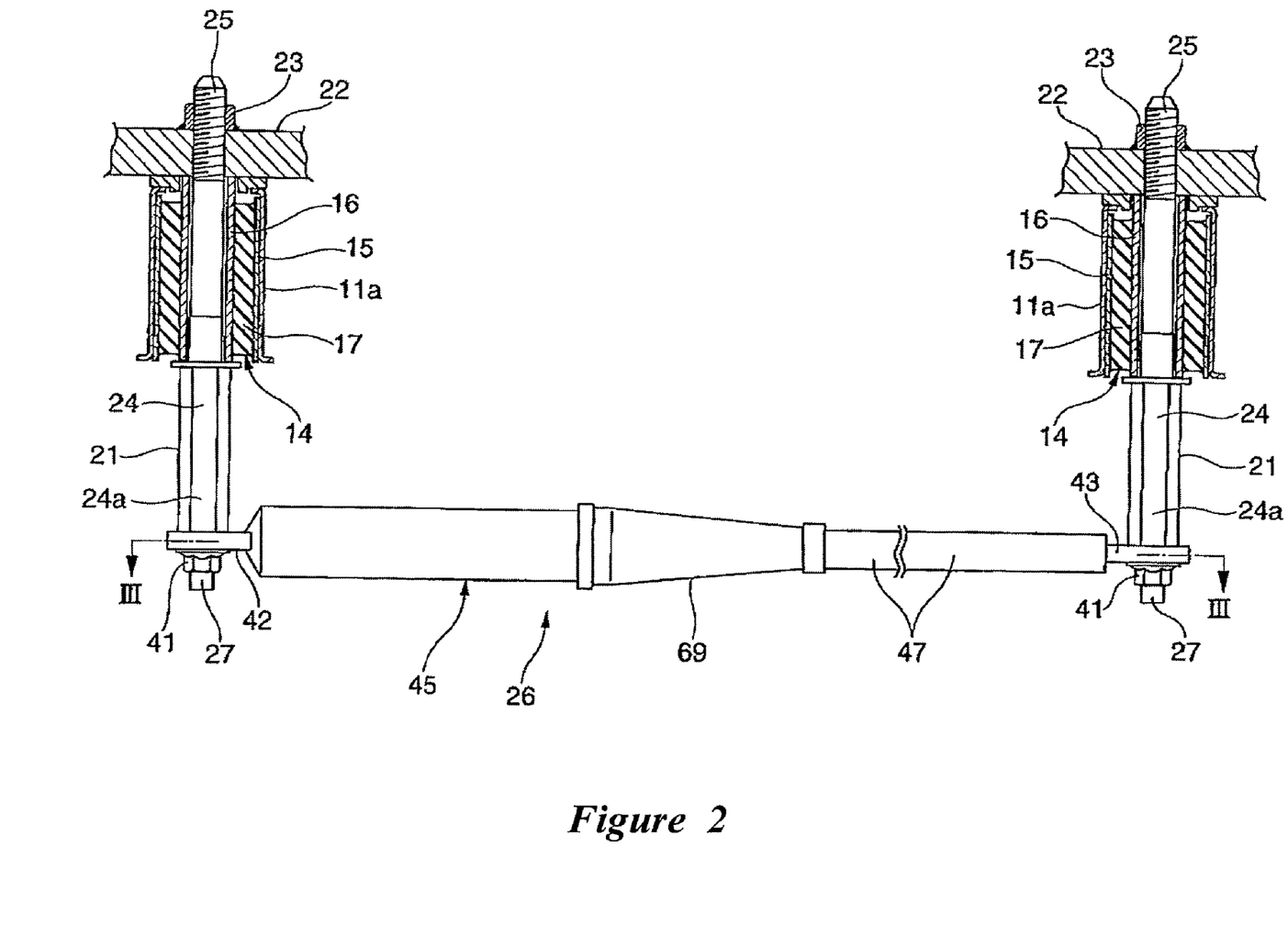
FIG. 2 shows a front view illustrating the vehicle body vibration damping apparatus mounted to a body frame.

As shown in FIG. 2, the illustrated mount member 14 comprises an outer cylinder 15 fitted with and welded to a connection cylinder 11a provided on the front suspension member 11, an inner cylinder 16 disposed inside the outer cylinder 15 in a position coaxial with the outer cylinder 15, and a damper rubber 17 interposed between the outer cylinder 15 and the inner cylinder 16.

As shown in FIG. 2, the two of the mount members 14, 14 positioned on the front side of the vehicle body are mounted on a floor panel 22 of the monocoque body 1 by a mounting bolt 21. The mounting bolt 21 passes through the mount member 14 and is screwed into a nut 23 welded on an upper surface of the floor panel 22. Thus, the mounting bolt 21 comprises a threaded section 25.

The mounting bolt 21 preferably comprises a head 24 that is longer than heads of conventional bolts. The cross section of the head 24 in one embodiment is generally hexagonal. An extended section 24a of the head 24 extends opposite to the threaded section 25 along an axial line of the mounting bolt 21. The extended section 24a preferably is integral with the head 24 of the mounting bolt 21.

A male screw 27 that is used to mount the vehicle body vibration damping apparatus 26 described below can be coaxially formed on the extended section 24a of the head 24. The cross section of the head 24 is not limited to a hexagon. Any shape is suitable as long as a tightening tool (not shown) can engage the shape or another feature can be provided on the mounting bolt 21 to allow engagement with a tool (e.g., recesses, slots, groves, flats, and the like).

The two mount members 14, 14 positioned on the rear side of the vehicle body (not shown) among the four mount members 14 can be mounted on the floor panel 22 by a conventional bolt having the head 24 shorter than the head 24 of the mounting bolt 21. Other suitable configurations also can be used.

In other words, the front suspension member 11 can be mounted on the lower surface of the floor panel 22 by four mount members 14, two mounting bolts 21, and two conventional bolts (not shown).

Figure 6:
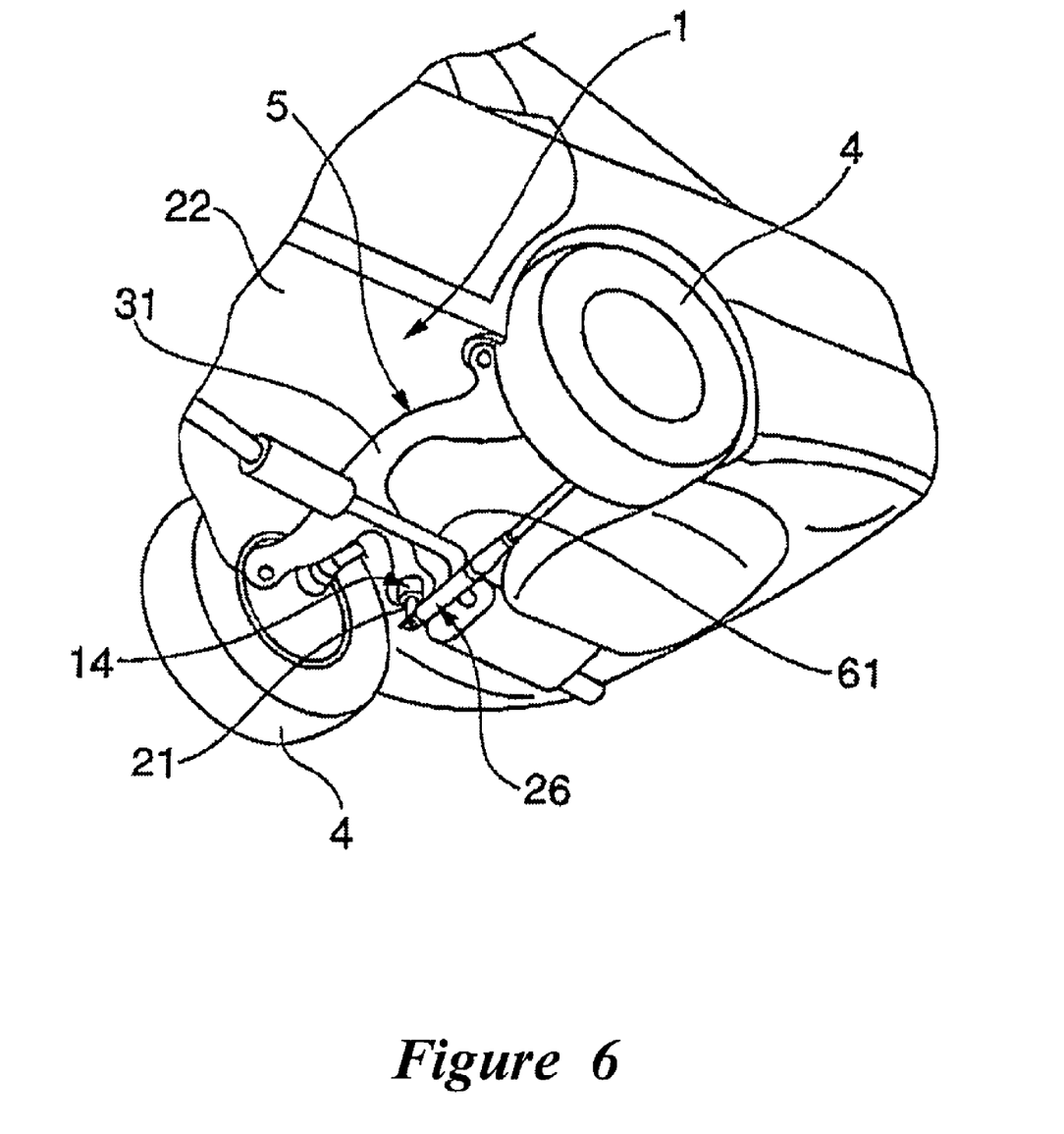
FIG. 6 is a bottom perspective view illustrating the vehicle body vibration damping apparatus mounted to mounting bolts used to mount the rear wheel suspension.

The rear wheel suspension 5 can be a double wishbone type. As shown in FIG. 1 and FIG. 6, the rear wheel suspension 5 comprises a rear suspension member 31, a front lower control arm 32, a rear lower arm 33, a knuckle 34, an upper arm 35, a rear cushion unit 36, and the like.

The rear suspension member 31 forms a frame that can support parts included in the rear wheel suspension 5. The mount members 14 used to mount the rear suspension member 31 to the monocoque body 1 can be provided on both ends in the width direction of the vehicle on the front side of the rear suspension member 31 and on the of the rear suspension member 31 respectively. The mount members 14 preferably are formed in the same manner as the mount members 14 shown FIG. 2.

As shown in FIG. 2, two of the four mount members 14 are positioned on the rear side of the vehicle body and those mount members are used to mount the rear wheel to the floor panel 22. In the illustrated configuration, each of the mount members 14 is mounted to the floor panel by a mounting bolt 21. In other words, the rear end of the rear suspension member 31 is mounted on the floor panel 22 by the same mount structure as used at the front end of the front suspension member 11. Therefore, the vehicle body vibration damping equipment 26 described below also is mounted to the two mounting bolts 21, 21 for mounting the rear end of the rear suspension member 31 to the floor panel 22.

The two of the four mount members 14, 14 positioned on the front side of the vehicle body for the rear wheel suspension are mounted to the floor panel 22 by conventional bolts having heads 24 that are shorter than the heads 24 of the mounting bolts 21. The rear end of a rear stability brace 37 can be mounted on the lower surface of the left and right front ends of the rear suspension member 31, each of the ends being provided with a mount member 14.

The rear stability braces 37, 37 connect the front end of the rear suspension member 31 and the forward part detached from the front end of the rear suspension member 31 to the floor panel 22. Thus, the rear stability braces 37, 37 improve the mount rigidity of the rear suspension member 31 and the rigidity of the floor panel 22 around the rear suspension member 31. The front ends of the rear stability braces 37, 37 preferably are mounted on the floor panel 22 by the mount structure shown in FIG. 2.

Specifically, the front end of the rear stability brace 37 can be provided with the mount member 14 and can be mounted to the floor panel 22 by the mount member 14 with the mounting bolt 21 penetrating through the mount member 14. The vehicle body vibration damping apparatus 26 described below also can be mounted to the mounting bolt 21. The rear end of the rear stability brace 37 can be mounted to the lower end of the mounting bolt 21 by mounting the front end of the rear suspension member 31 to the floor panel 22 with the mounting bolt 21. In this case, the rear stability brace 37 can be positioned as indicated by chain double-dashed lines in FIG. 1.

Figure 3:
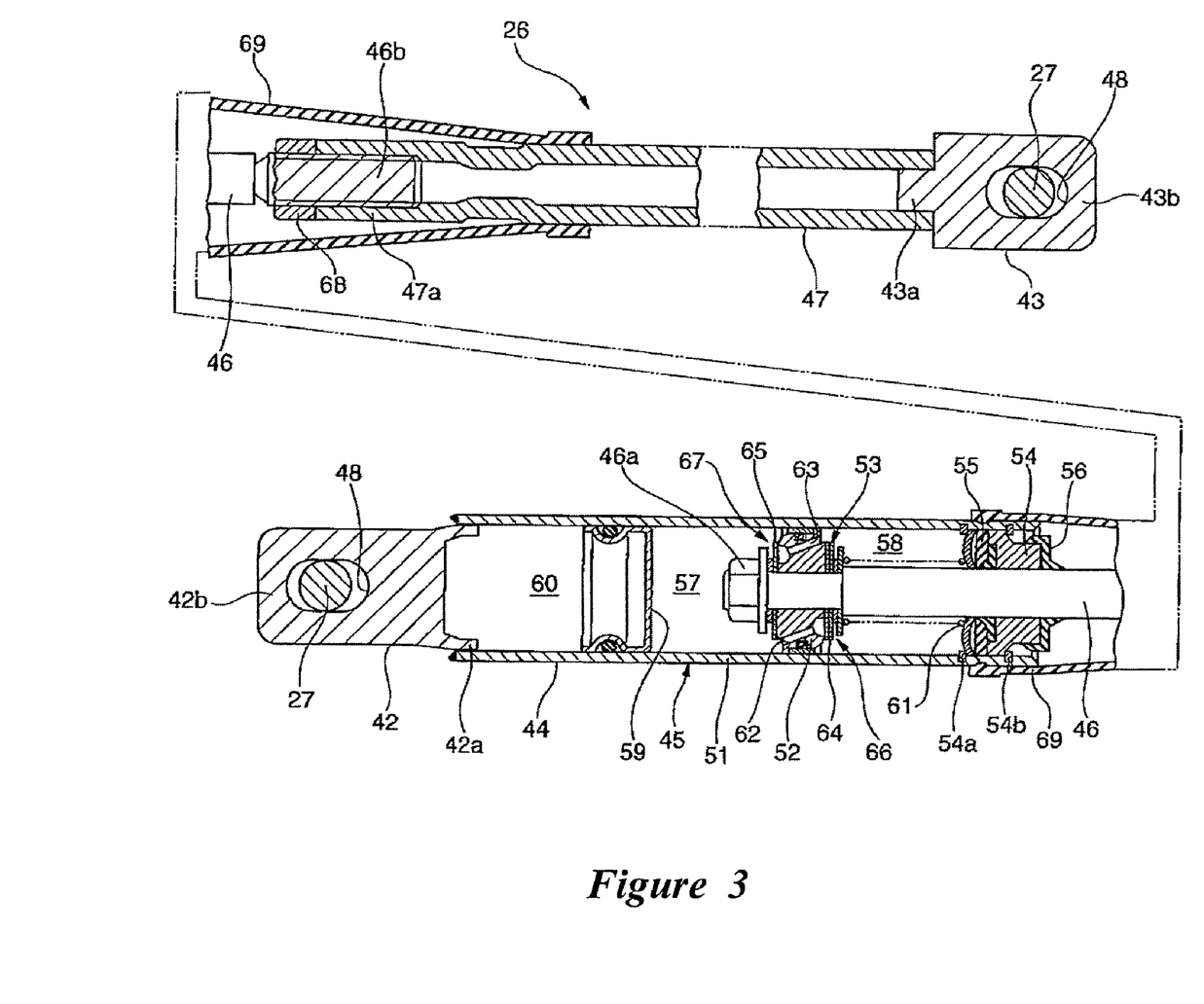
FIG. 3 is a cross-sectional view taken along a line III-III in FIG. 2.

As shown in FIG. 2 and FIG. 3, the vehicle body vibration damping apparatus 26 preferably comprises mount brackets 42, 43 mounted by tightening a nut 41 to the two mounting bolts 21. The vehicle body vibration damping apparatus 26 also preferably comprises a hydraulic damper 45 comprising a hydraulic cylinder 44 with one end welded to the mount bracket 42 on one side (i.e., on the left side in FIG. 2) and an extension rod 47 that connects a piston rod 46 of the hydraulic damper 45 and the mount bracket 43 on the other side. The vibration damping apparatus 26 preferably has an elongated overall shape. The mount section in the illustrated configuration comprises the mount brackets 42, 43, while the hydraulic damping force generation means can be defined by the hydraulic damper 45.

As shown in FIG. 3, the mount brackets 42, 43 comprise fitting sections 42a, 43a receive, and can be welded to, the hydraulic cylinder 44 and the extension rod 47 respectively. Plate sections 42b, 43b can be mounted to the mounting bolt 21. A through hole 48, through which the male screw 27 of the mounting bolt 21 can be inserted, preferably is formed in the plate sections 42b, 43b. In one configuration, the through hole 48 is elongated in the longitudinal direction of the vehicle body vibration damping apparatus 26 such that manufacturing tolerances and an assembly tolerances can be accommodated.

As shown in FIG. 3, the hydraulic damper 45 comprises the hydraulic cylinder 44 having a closed-ended cylinder tube 51 and a throttle 53 provided on a piston 52 of the hydraulic cylinder 44.

One end of the cylinder tube 51 can be closed by the mount bracket 42 and the bracket 42 can be welded in position. The other end of the cylinder tube 51 can be closed by a rod guide 54 that supports the piston rod 46 such that it can move freely in an axial direction. The rod guide 54 can be received inside of the cylinder tube 51 and can be secured to the cylinder tube 51 by circlips 54a, 54b or any other suitable technique.

Seal members 55, 56 can be used to seal the region of the rod guide 54 through which the piston rod 46 passes. The seal members 55, 56 can be provided on both axial ends of the rod guide 54.

The cross section of the piston 52 can be circular such that it fits in the cylinder tube 51. The piston 52 defines a first oil chamber 57 and a second oil chamber 58 in the cylinder tube 51 and, further, is fixed with a nut 46a on the piston rod 46, which passes through the center axis of the piston 52.

The first oil chamber 57 is formed between the piston 52 and a free piston 59 that is axially moveable within the cylinder tube 51. The free piston 59 preferably separates one end of the cylinder tube 51 into the first oil chamber 57 and a high-pressure gas chamber 60. High-pressure N2 gas can be provided in the high-pressure gas chamber 60.

A compression coil spring 61 can be positioned between the piston 52 and the rod guide 54 such that the compression coil spring 61 biases the piston 52 in the direction in which the hydraulic cylinder 44 reacts. The compression coil spring 61 counterbalances gas reaction forces applied from the hydraulic fluid in the cylinder tube 51 to the piston 52. The gas reaction force is generated because the pressure receiving surface area on the second oil chamber side is smaller than pressure receiving surface area on the first oil chamber side of the piston 52.

In the illustrated hydraulic damper 45, the free length is the length in which the gas reaction force is canceled and balanced by the elastic force of the compression coil spring 61. The pressure of the N2 gas in the hydraulic damper 45 can be adjusted so that the free length corresponds to the mounting dimension on the vehicle body.

As the free length corresponds to the mounting dimension on the vehicle body, the initial load of the hydraulic damper 45 mounted on the vehicle body is zero. Accordingly, even if a little load is applied, the hydraulic damper 45 is immediately compressed and damping force is generated.

The throttle 53 provided on the piston 52 has the same structure as the structure used for a shock absorber for a suspension system and the like. The throttle 53 preferably comprises a first check valve 66 and a second check valve 67. The check valves 66, 67 can be provided with leaf springs 64, 65 that are used to open and close the opening on one end of connecting holes 62, 63 drilled in the piston 52. The leaf springs 64, 65 are formed in a shape of a ring and the inner circumferences thereof are fixed on the piston 52 such that a plurality of leaf springs forms a stack.

The first check valve 66 generates damping force when hydraulic fluid flows from the first oil chamber 57 to the second oil chamber 58 in a direction against the elastic force of the leaf spring 64. The second check valve 67 generates damping force when hydraulic fluid flows from the second oil chamber 58 to the first oil chamber 57 in a direction against the elastic force of the leaf spring 65.

The extension rod 47 used to connect the end of the piston rod 46 and the mount bracket 43 can be formed with a pipe and one end of the extension rod 47 can be threaded into the end of the piston rod 46 while the other end is welded to the mount bracket 43.

A male screw 46b formed on the piston rod 46 can be threaded into a female portion 47a on the extension rod 47 to define a junction or joint section between the extension rod 47 and the piston rod 46. Accordingly, the structure allows the overall length to be adjusted and the joint section can be locked by a lock nut 68.

As shown in FIG. 3, the threaded section is covered with a rubber boot 69 that connects the extension rod 47 and the cylinder tube 51. The rubber boot 69 reduces or eliminates the likelihood that muddy water and dust will adhere to the piston rod 46. The rubber boot 69 can be formed in a shape of a cylindrical cone, and one end of the rubber boot 69 can be fixed on the outer circumference of the cylinder tube 51 while the other end of the rubber boot 69 can be fixed on the outer circumference of the extension rod 47.

The vehicle body vibration damping apparatus 26 can be installed by mounting the front end of the front suspension member 11, the rear and of the rear suspension member 31, and the front end of the rear stability brace 37 to the mounting bolt 21 used to mount the assembly to the floor panel 22. Specifically, the front end of the front suspension member 11, the rear and of the rear suspension member 31, the front end of the rear stability brace 37, and so forth first are mounted to the floor panel 22 with the mounting bolt 21. At this time, the tightening torque for the mounting bolt 21 is set to the amount which can surely fix each of the components to the floor panel 22.

Then, the male screw 27 at the lower end of the mounting bolt 21 is inserted in the through hole 48 in the mount brackets 42, 43 of the vehicle body vibration damping apparatus 26. The nut 41 is tightened on the male screw 27 via a washer or the like (not shown). As the nut 41 is tightened, the plate sections 42b, 43b of the mount brackets 42, 43 are pressed on the hexagonal head 24 from the lower side and are secured there. The installation of the vehicle body vibration damping apparatus 26 to the side of the vehicle body can be completed by tightening the nut 41 on the male screw 27 of the mounting bolt 21 as described above.

The tightening torque used when the nut 41 is tightened on the male screw 27 is smaller than the tightening torque used when the mounting bolt 21 is tightened on the nut 23 of the floor panel 22. Therefore, the tightening torque can be optimized for mounting the vehicle body vibration damping apparatus 26.

The vehicle body vibration damping apparatus 26 can be secured to the floor panel 22 in a position spaced downward from the floor panel 22 while extending in the width direction of the vehicle by mounting the vehicle body vibration damping apparatus 26 to the mounting bolt 21 as described above.

Because the vehicle body vibration damping apparatus 26 is disposed in a position spaced downward from the floor panel 22, the likelihood of interference with an exhaust pipe 71, which will cross the rear suspension member 31 because the rear suspension member 31 extends in the longitudinal direction of the vehicle body, can be reduced or eliminated, as shown in FIG. 6. The rear stability brace 37 is omitted from FIG. 6.

The vehicle body vibration damping apparatus 26 in the illustrated embodiment can be mounted to the mounting bolt 21, which is used to mount the attached components, such as the front suspension member 11, the rear suspension member 31, and the rear stability brace 37, to the floor panel 22 (i.e., the bottom section of the illustrated body frame). Consequently, the vehicle body vibration damping apparatus 26 can be mounted to the vehicle body more compactly than when the vehicle body vibration damping apparatus 26 is mounted to the attached component or in the vicinity of the attached component directly or via a dedicated bracket.

When the vehicle body vibration damping apparatus 26 is mounted to the vehicle body, parts that are uniquely related to the mounting can be two washers and two nuts 41, 41. Thus, there is no need for a dedicated bracket, a dedicated mounting bolt 21, or the like. When the vehicle body vibration damping apparatus 26 is mounted to the vehicle body (e.g., the body frame), the number of added parts can be decreased in comparison to the conventional mount structure.

The illustrated vehicle body vibration damping apparatus 26 can be mounted to the mounting bolt 21, which already has been used to mount the attached component to the floor panel 22. In other words, tightening of the mounting bolt 21 on the nut 23 on the floor panel 22 is performed separately from tightening of the nut 41 on the mounting bolt 21 used to secure the vehicle body vibration damping apparatus 26. Accordingly, even though the attached components, such as the front suspension member 11, the rear suspension member 31, the rear stability brace 37, and the like, and the vehicle body vibration damping apparatus 26 are mounted to the floor panel 22 by one mounting bolt 21, the tightening torque for mounting the vehicle body vibration damping apparatus 26 differ from the tightening torque used to secure the attached components to the floor panel 22.

As a result, the vehicle body vibration damping apparatus 26 can be correctly mounted to the floor panel 22 while the likelihood of deformation of the vehicle body vibration damping apparatus 26 caused by transmission of high tightening torques can be reduced or eliminated.

In one embodiment, the vehicle body vibration damping apparatus 26 can be mounted to the vehicle body using a compact structure that includes a small number of additional parts. Thus, the vehicle body vibration damping apparatus 26 can be mounted to a pair of mounting bolts 21, 21 on the left and on the right sides that also are used to mount the front suspension member 11 and the rear suspension member 31 to the monocoque body 1. Therefore, vibration generated in the monocoque body 1 from the front wheel suspension 3 and the rear wheel suspension 5 can be damped by the vehicle body vibration damping apparatus 26.

Further, in one embodiment, the vehicle body vibration damping apparatus 26 can be mounted to a pair of the mounting bolts 21, 21 on the left and right sides for mounting the front end of the rear stability brace 37 to the monocoque body 1. Therefore, the vehicle body vibration damping apparatus 26 can be firmly mounted to the monocoque body 1. Consequently, vibration generated in the monocoque body 1 can be surely damped.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A vehicle body vibration damping apparatus and mounting structure comprising hydraulic damping force generation means formed in a long shape for generating damping force with respect to deformation in the longitudinal direction, and each end of the damping force generation means comprising a mount section adapted to secure the vibration damping apparatus to a body frame in a bottom section of a vehicle, an extended section being provided on a head of a mounting bolt used to mount an attached component to the bottom section of the body frame, the extended section extending along an axis of the mounting bolt in the direction opposite to a threaded section, a male screw is formed on the extended section, and the mount section of the vehicle body vibration damping apparatus is mounted to the male screw.

2. The vehicle body vibration damping apparatus and mounting structure of claim 1, wherein the attached component is a suspension system, the mounting bolt mounts at least part of the suspension system to the body frame, and the ends of the vehicle body vibration damping apparatus are mounted to the mounting bolts.

3. The vehicle body vibration damping apparatus and mounting structure of claim 1, wherein the attached component is a reinforcing member extending between two points of the body frame, the mounting bolt is used to mount the reinforcing member to the body frame, and the ends of the vehicle body vibration damping apparatus are mounted to the mounting bolts.

4. A vehicle comprising a body frame, a fastener connecting a suspension component to the body frame, the fastener having a first threaded region and a second threaded region, the first threaded region used to secure the suspension component to the body frame and the second threaded region used to secure the fastener to an elongated vibration damping apparatus such that a first torque level can be used to secure the suspension component to the body frame and a second torque level can be used to secure the vibration damping apparatus to the vehicle.

5. The vehicle of claim 4, wherein the first threaded region comprises a male thread and the second threaded region comprises a male thread.

6. The vehicle of claim 4, wherein the second threaded region comprises a male thread.

7. The vehicle of claim 6, wherein the male thread extends through a mounting portion of the vibration damping apparatus.

8. The vehicle of claim 7, wherein the mounting portion of the vibration damping apparatus comprises a slotted opening.

9. The vehicle of claim 8, wherein the slotted opening has an elongated dimension in an axial direction of the vibration damping apparatus.

10. The vehicle of claim 4, wherein the fastener comprises an elongated portion with a tool engaging feature.

11. The vehicle of claim 10, wherein the tool engaging feature is defined by a hexagonal outer surface.

12. The vehicle of claim 4, wherein a tool engaging feature is defined between at least a portion of the first threaded region and the second threaded region.

13. The vehicle of claim 12, wherein the tool engaging feature comprises a hexagonal outer surface.

14. The vehicle of claim 13, wherein the second threaded region comprises a male threaded member and the male threaded region extends from the hexagonal outer surface.

* * * * *